W. KISTLER & A. L. BUTCHER.
LATHE.
APPLICATION FILED MAR. 11, 1914.
1,252,271.
Patented Jan. 1, 1918.
8 SHEETS—SHEET 1.
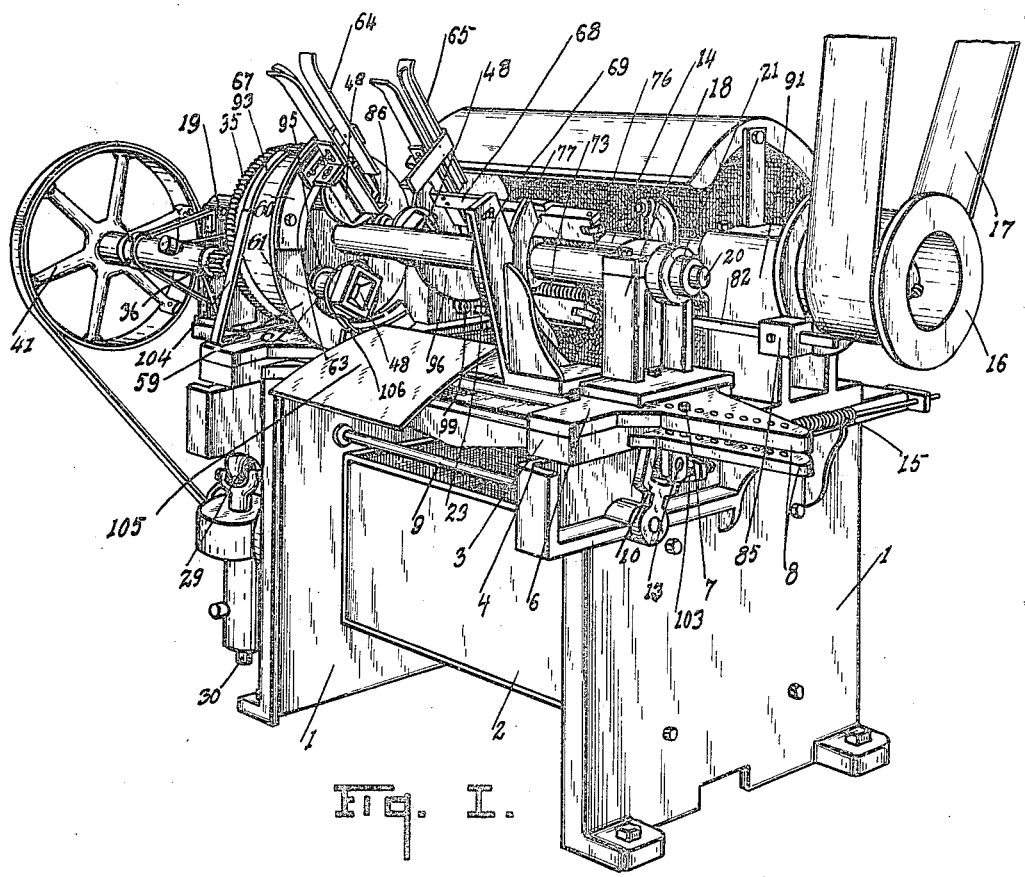
Fig. I.
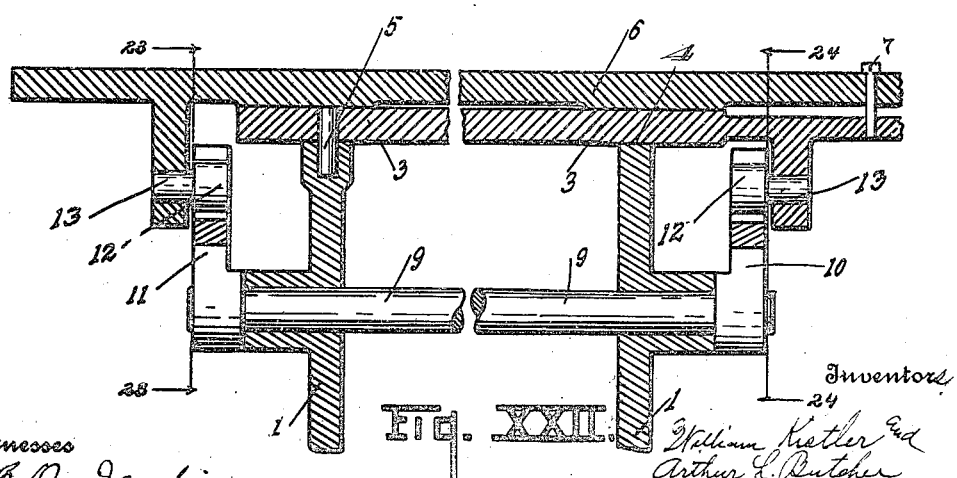
Fig. XXII.

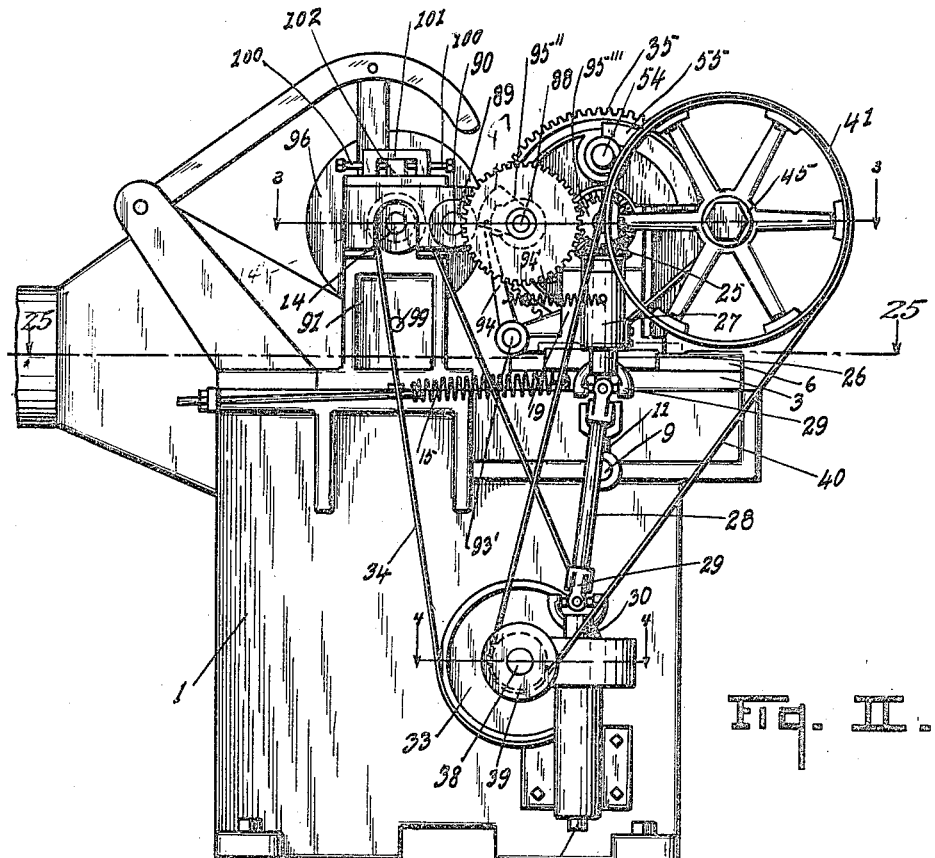
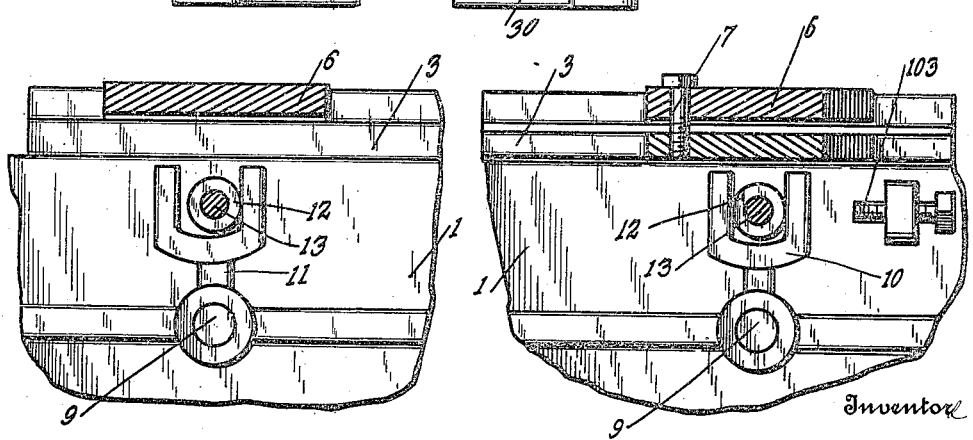

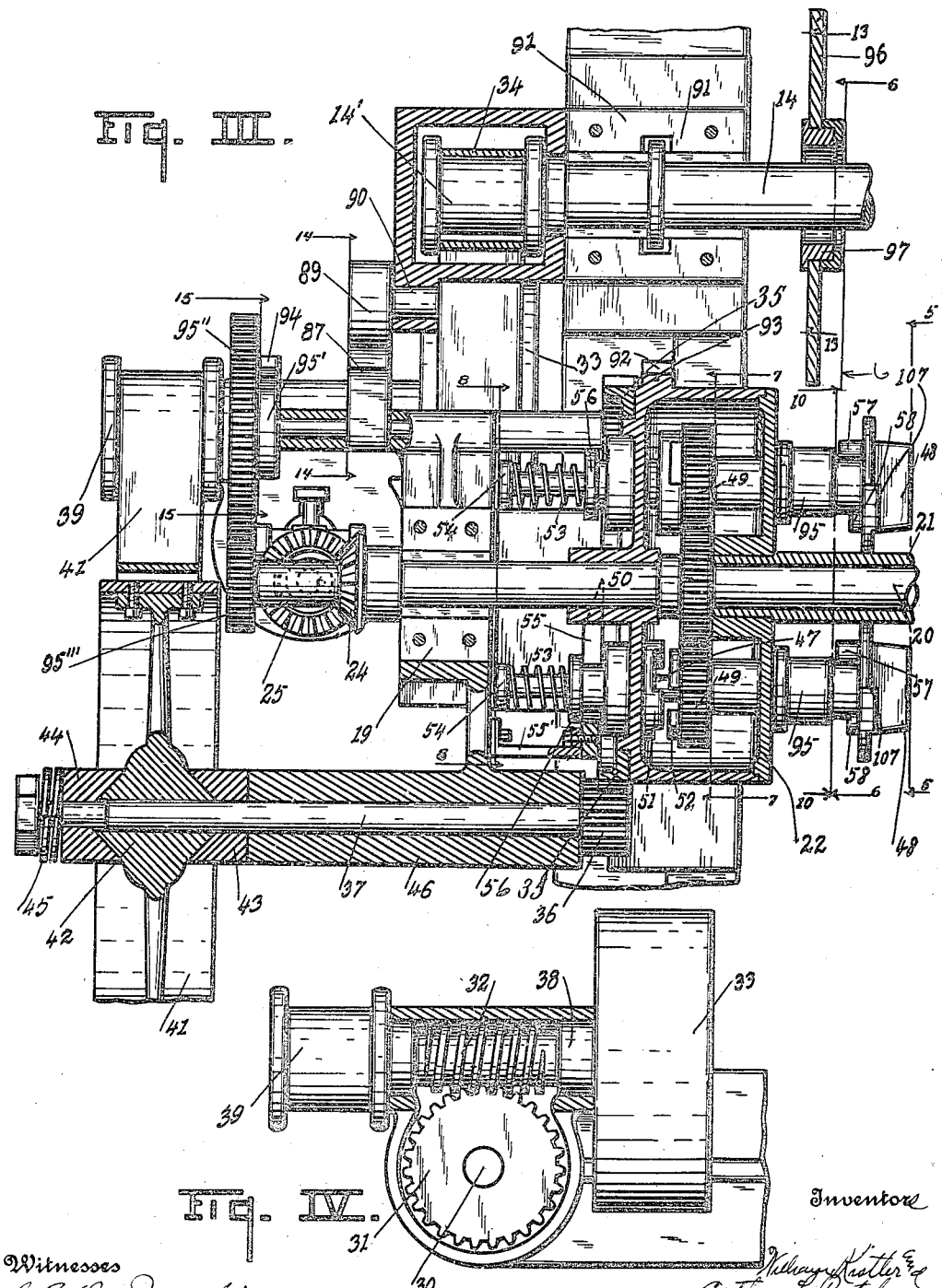

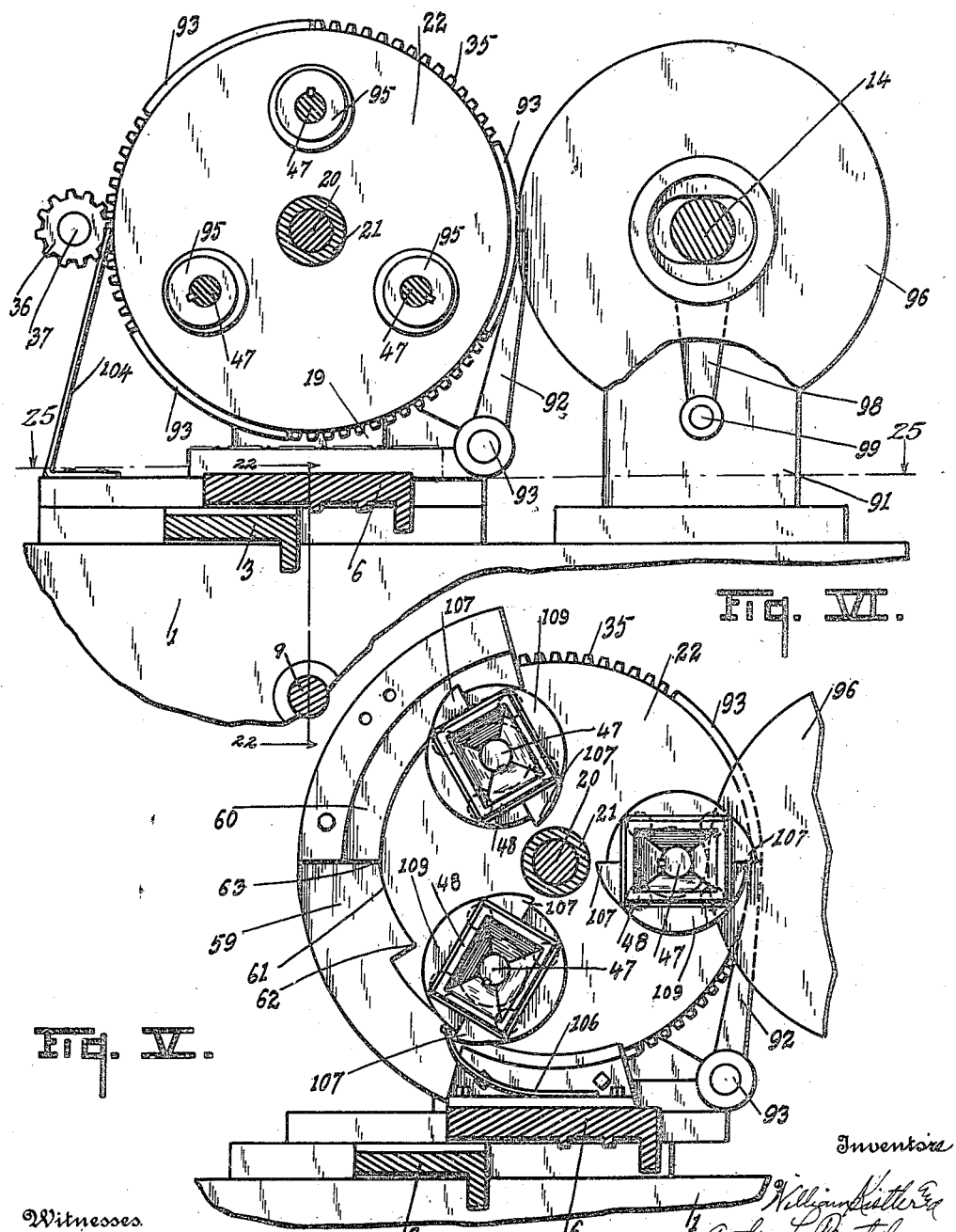

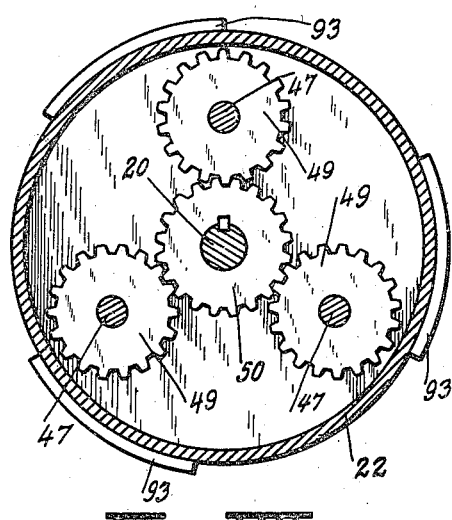
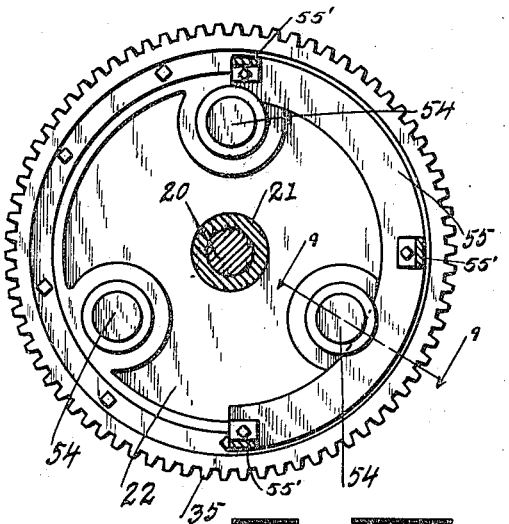
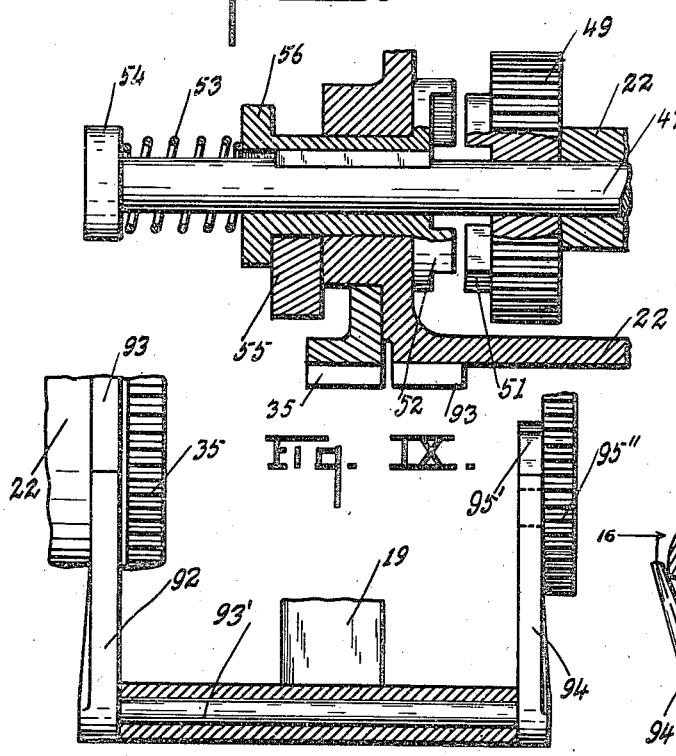
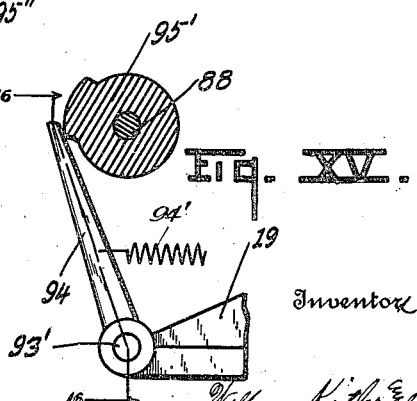

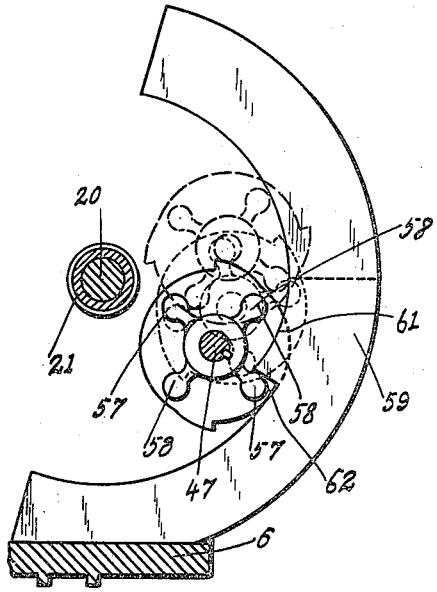
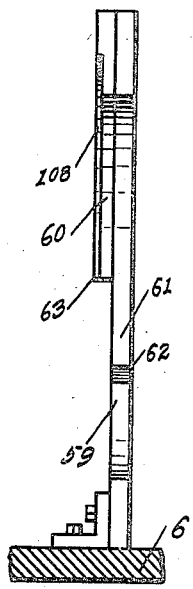
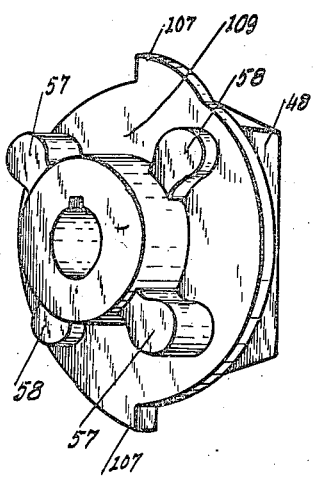
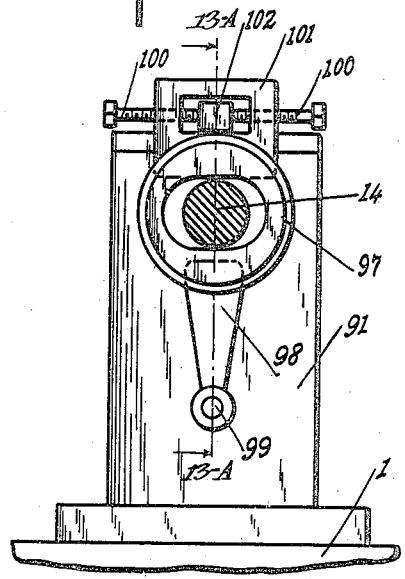
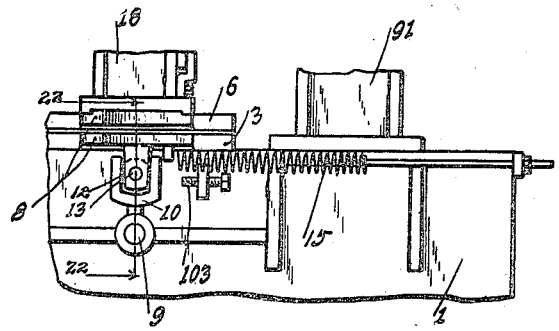

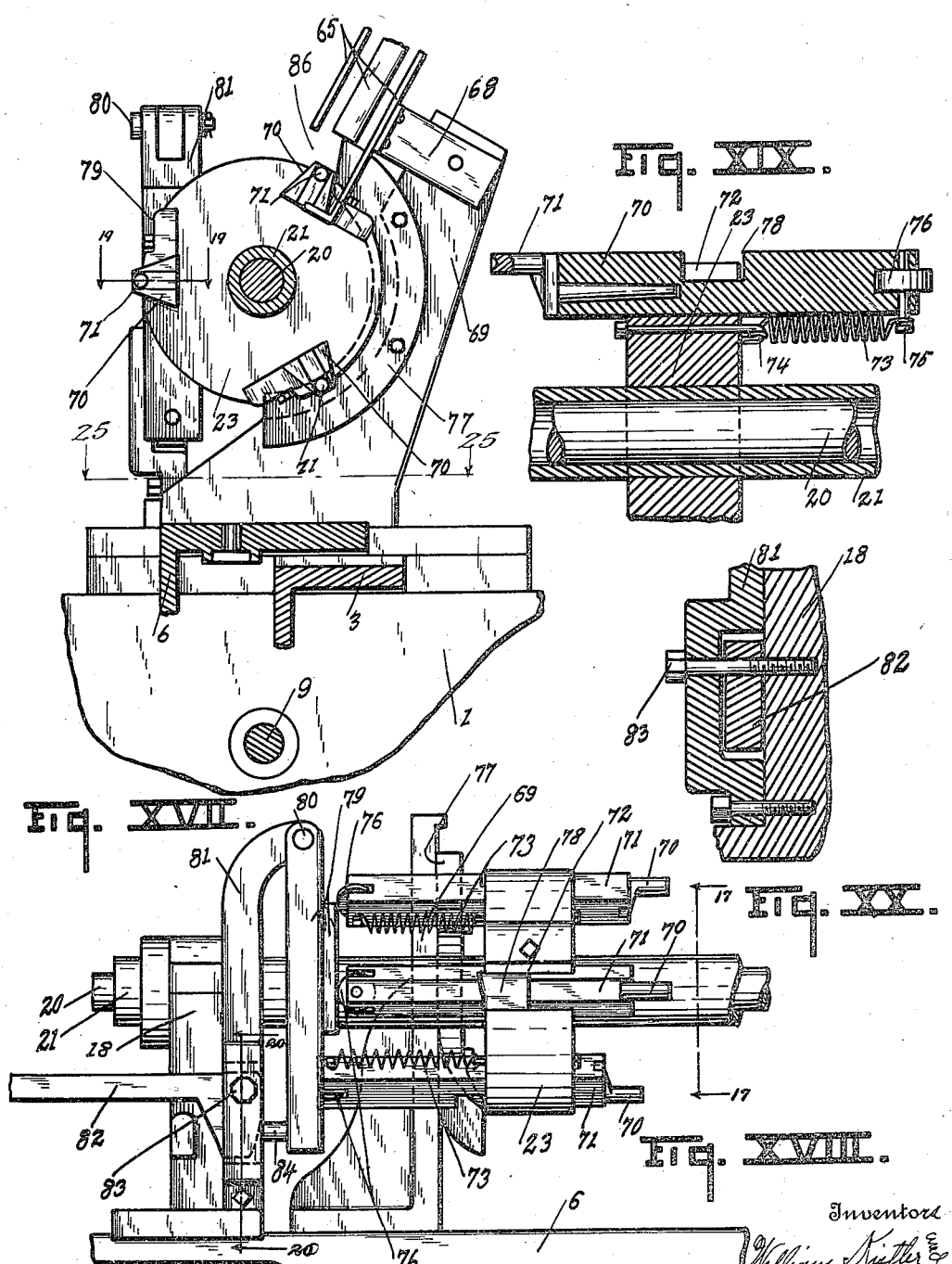

W. KISTLER & A. L. BUTCHER.
LATHE.
APPLICATION FILED MAR. 11, 1914.
1,252,271.
Patented Jan. 1, 1918.
8 SHEETS—SHEET 8.
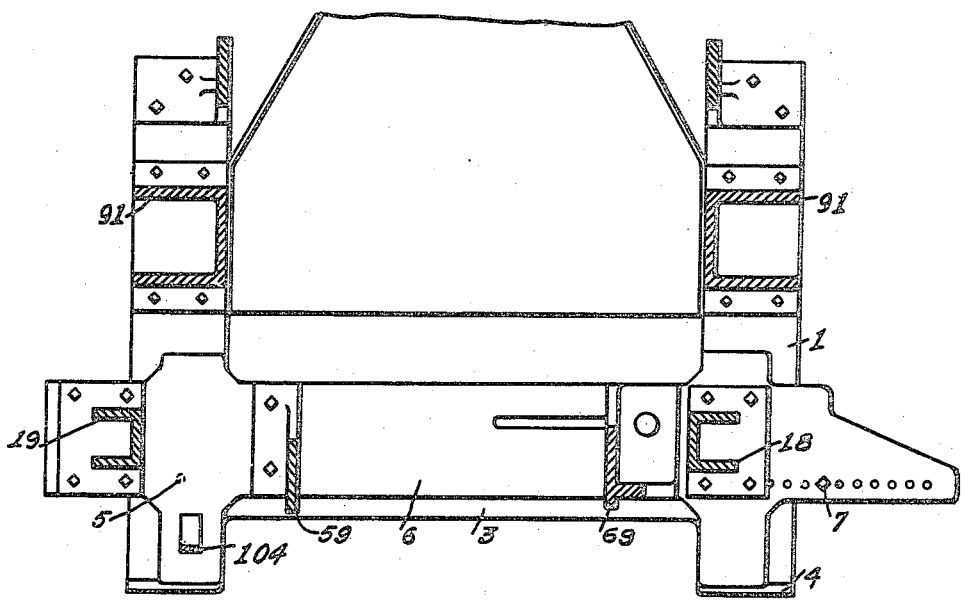
Fig. XXV.
Fig. XXVI.
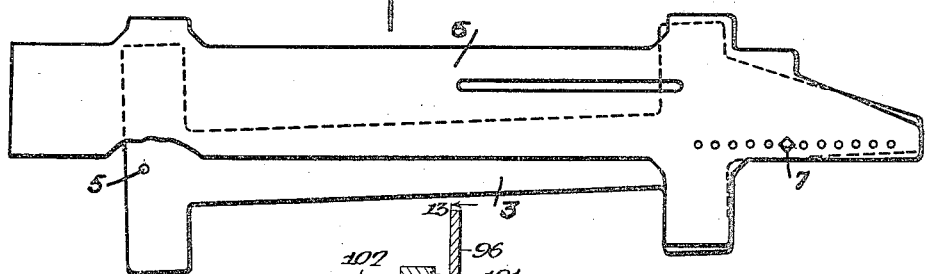
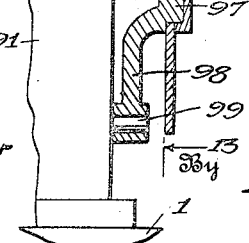
Fig. XIII-A.
Inventors
William Kistler
Arthur L. Butcher
Witnesses
Margaret Glasgow
L. W. Pomeroy
By C. Chappell Earl
Attorneys

UNITED STATES PATENT OFFICE.

WILLIAM KISTLER AND ARTHUR L. BUTCHER, OF JACKSON, MICHIGAN, ASSIGNORS TO HAYES WHEEL COMPANY, OF JACKSON, MICHIGAN.

LATHE.

1,252,271. Specification of Letters Patent. Patented Jan. 1, 1918.

Application filed March 11, 1914. Serial No. 824,004.

*To all whom it may concern:*

Be it known that we, WILLIAM KISTLER and ARTHUR L. BUTCHER, citizens of the United States, residing at Jackson, Michigan, have invented certain new and useful Improvements in Lathes, of which the following is a specification.

This invention relates to improvements in lathes.

Our improvements are especially designed by us for embodiment in spoke lathes and we have illustrated them in such a machine. Certain features are, however, desirable and capable of use in machines designed for other purposes.

The main objects of this invention are:

First, to provide an improved lathe of large capacity.

Second, to provide in a lathe, an improved work driving mechanism.

Third, to provide an improved lathe which is very simple and easy to operate and is comparatively simple in structure.

Further objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawings forming a part of this specification, in which:

Figure I is a front perspective view of a lathe structure embodying the features of our invention.

Fig. II is an end elevation looking from the left of Fig. I.

Fig. III is a horizontal section showing details of the work driving and feed mechanism, taken on the line 3—3 of Fig. II.

Fig. IV is a detail horizontal section on a line corresponding to line 4—4 of Fig. II.

Fig. V is a detail vertical section on a line corresponding to line 5—5 of Fig. III, showing details of the head stock member.

Fig. VI is a detail vertical section on a line corresponding to the broken line 6—6 of Fig. III, showing further details of the head stock mechanism.

Fig. VII is a detail vertical section on a line corresponding to line 7—7 of Fig. III, showing details of the head stock spindle driving mechanism.

Fig. VIII is a detail vertical section on a line corresponding to line 8—8 of Fig. III, showing details of the head stock spindle clutch mechanism.

Fig. IX is a detail section on a line corresponding to line 9—9 of Fig. VIII.

Fig. X is a detail vertical section on a line corresponding to line 10—10 of Fig. III, showing further details of the feed mechanism.

Fig. XI is a detail front view of the holding cam for the work chucks.

Fig. XII is an enlarged rear perspective view of one of the work holders or chucks, showing the control members thereon.

Fig. XIII is a detail vertical section on a line corresponding to the broken line 13—13 of Figs. III and XIII^A, showing details of the pattern adjustment. Fig. XIII^A is an edge view of the structure appearing in Fig. XIII.

Fig. XIV is a detail vertical section on a line corresponding to the line 14—14 of Fig. III, showing details of the head stock control mechanism.

Fig. XV is a detail vertical section on a line corresponding to line 15—15 of Fig. III, showing further details of the head stock control mechanism.

Fig. XVI is a detail section on a line corresponding to the broken line 16—16 of Fig. XV.

Fig. XVII is a detail vertical section of the tail stock mechanism, on a line corresponding to line 17—17 of Fig. XVIII.

Fig. XVIII is a detail rear elevation view of the parts shown in Fig. XVII.

Fig. XIX is a detail section on a line corresponding to line 19—19 of Fig. XVII.

Fig. XX is a detail vertical section on a line corresponding to line 20—20 of Fig. XVIII.

Fig. XXI is a detail partial end elevation looking from the right of Fig. I, showing details of the bed supports.

Fig. XXII is an enlarged detail vertical longitudinal section on a line corresponding to line 22—22 of Fig. XXI.

Fig. XXIII is a detail vertical section on a line corresponding to line 23—23 of Fig. XXII.

Fig. XXIV is a detail vertical section on a line corresponding to line 24—24 of Fig. XXII.

Fig. XXV is a sectional plan view on line 25—25 of Figs. II, VI and XVII, showing in detail the oscillating bed members in their forward position and their relation to the frame of the machine.

Fig. XXVI is a detail plan view of the oscillating bed members showing their position with respect to each other when they have moved to the inner position.

In the drawing, similar reference characters refer to similar parts throughout the several views, and the sectional views are taken looking in the direction of the little arrows at the ends of the section lines.

Referring to the reference numerals of the drawing, the main or supporting frame in the structure illustrated, comprises end members 1 connected by the horizontal tie piece or member 2. The lower table or bed member 3 is mounted to oscillate on the way 4 on the upper end of one end member and is pivotally connected by the pivot 5 to the upper end of the other end member of the main frame. See Figs. I and XXII.

The upper table or bed member 6 is mounted on the lower bed member 3 to oscillate thereon, it being connected thereto by the adjustable pivot 7, see Figs. I, XXII, XXIII and XXIV. The table or bed members are provided with projecting arms or extensions 8 having a series of holes therein adapted to receive the pin 7.

The swinging ends of the table or bed members are oscillated from the rock shaft 9, having arms 10 and 11 at the ends thereof. These arms are forked at their ends, the fork of the arm 10 engaging a roller 12 carried by a pin 13 on the lower bed member 3. The fork of the arm 11 engages a similar roller 12 carried by the pin 13 on the upper bed member 6. With the bed members thus connected, the rock shaft controls their movement, giving the upper member a reciprocatory movement and also permits an oscillating movement of the upper member on its pivot, the oscillating movement of the upper member being controlled by the adjustment of the pin 7. The bed members are actuated toward the cutters on the cutter shaft 14, the cutters not being shown, by means of the springs 15, there being a spring at each end of the machine.

The cutter shaft 14 is driven from the pulley 16 and driving belt 17. The cutter shaft also constitutes the driving shaft of the machine in the structure illustrated. The head and tail stock mechanisms are mounted upon the upper bed or table member 6 which is provided with a bearing pedestal 18 at one end and a bearing pedestal 19 at the other end.

A shaft 20 is mounted in suitable bearings in these pedestals 18 and 19. Rotatably mounted on this shaft 20 is a sleeve 21 having the head stock 22 secured to one end thereof,—see Figs. I and III, and the tail stock 23 on the other end thereof. See Figs. XVII, XVIII and XIX.

The shaft 20 is provided with a beveled gear 24 meshing with a beveled gear 25 on a shaft 26 which is supported in a bearing 27 on the pedestal 19. See Figs. II and III. The shaft 26 is connected by the shaft 28 and universal joints 29 to a shaft 30 having a worm gear 31 thereon, meshing with the worm 32. See Figs. II and IV. The worm 32 is provided with a fixed pulley 33 connected by the belt 34 to the pulley 14' on the shaft 14.

The head stock 22 is provided with a gear 35 with which the pinion 36 on the shaft 37 meshes. The shaft 37 is driven from the shaft 38 of the worm 32, it being provided with a fixed pulley 39 for the belt 40. The shaft 37 is provided with a pulley 41 which has a conical hub 42 coacting with the clutch member 43 fixed to the shaft and the clutch member 44 splined to the shaft and held yieldingly against the conical hub 42 by means of the spring washers 45. This allows the pulley to slip when the head stock is stopped or locked against rotative movement.

The bearing 46 of the shaft 37 is carried by the pedestal 19. The head stock 22, in the structure illustrated, carries three live spindles 47 provided with work holders or chucks 48. Rotatably mounted on these spindles are gears 49 meshing with a gear 50 keyed to the shaft 20.

The gears 49 are releasably connected to the spindles by means of clutches, the structure illustrated being provided with step clutches, the clutch members 51 being slidably but non-rotatably mounted on the spindles to permit their being engaged with and disengaged from the clutch members 52 on the gears.

The clutches are held in engaging position by the springs 53,—see Figs. III and IX,—the outer ends of the spindles being provided with rests or supports 54 for the springs. The clutches are disengaged by the cam 55 which is supported by the brackets 55' and is positioned to engage the flanges 56 on the outer ends of the clutch members 51 as the head stock is rotated, drawing the clutches outwardly to their disengaged position as shown in Fig. IX. As the head stock revolves, the clutch members 52 pass out of engagement with this cam and are thrown into engagement with the clutch members 51 on the gears by means of the springs 53. The gears 49 are continuously driven from the gear 50 on the shaft 20.

To properly position the chucks or work holders to receive the work, the chuck spindles are provided with fingers 57 and 58 arranged in radially disposed pairs to coact with the positioning abutments 60 and 61 respectively on the positioning member 59. These fingers are preferably formed integral with the chuck proper, as shown in Fig. X, one pair of fingers being wider than the other, so as to coact with the abutment 61, the narrower fingers coacting with the abutment 60.

The ends of the abutments constitute stops 62 and 63 with which the fingers engage as the head stock revolves, turning and positioning and holding the chucks in position as they are carried along by the turret. Should the parts be in such position that the fingers 57 pass the stop 62 of the abutment 61 without swinging the chuck to position, one or the other of the fingers 58 will engage the stop portion 63 of the abutment 60. To prevent the fingers striking endwise on the ends or stop portions of the abutments, we provide a spring 106 (see Fig. V) positioned to engage the projections 107 on the chuck, turning the same to such position as will prevent this end-on movement of the fingers and cause them to engage the abutments so as to be swung into proper position.

The abutment 60 is grooved at 108 to permit the passage of the disk-like portion 109 by which the projections 107 are carried. The chucks are held by the positioning cam when in billet receiving position, the spindles being positioned so that one chuck is in position to receive the work, while another is in coacting relation to the cutter.

In the structure illustrated, a magazine is provided consisting of two members 64 and 65 adapted to receive a number of billets arranged one upon another. In the structure illustrated, the magazine member 64 is carried by a bracket 67 on the positioning member 59, while the magazine member 65 is carried by an arm 68 on the bracket 69. As the billets drop into chuck engaging position, they are engaged with the chuck by a blow-like action of the tail stock members 70 carried by the tail stock 23. The tail stock members 70 are provided with dead spindles 71 for the billets. The tail stock has peripheral groove-like ways 72 for these members 70 whereby they are supported for longitudinal movement. The members 70 are actuated by the springs 73 to strike or force the billet into the chucks, one end of the springs being connected to the tail stock at 74 and the other, to the pins 75 on which the rollers 76 are journaled. See Figs. XVIII and XIX.

The tail stock members 70 are withdrawn and retained in their withdrawn position against the tension of their springs 73 by the cam 77, the members 70 being notched at 78 to engage the cam as the tail stock is revolved. The cam is positioned so that, as the members 70 are released in passing therefrom, they strike the ends of the billets, forcing them into the chuck, as described. As the tail stock revolves into coöperative relation with the cutters, the rollers 76 engage the cam block 79 pivoted at 80 on the arm 81 of the pedestal 18. In the event of the billet crowding farther into the chuck owing to the same being cut away, the cam member 79 causes the tail stock to properly follow and clutch the billet. The cam member 79 is acted upon by the weighted bell crank lever 82 pivoted at 83 with one arm engaging the projection 84 of the member 79. The weight 85 is preferably adjustable upon the arm, as indicated.

The magazine members are open at 86, see Figs. I and XVII, so that the billets are carried out of the same by the rotation of the head and tail stock. As soon as the engaged billet is moved out of the magazine, the following billet drops into position to be engaged by the succeeding chuck.

The head stock spindles are advanced to working position with a step by step movement controlled by the movement of the bed members of the machine.

The bed is oscillated in one direction by the cam 87 on the shaft 88 which coacts with the roller 89 on the stub shaft 90. See Figs. II, III and XIV. The shaft 88 is carried by the pedestal 19, while the shaft 90 is carried by one of the fixed pedestals 91 for the cutter shaft 14 on the main frame. This cam 87 throws or moves the work table or bed forward against the tension of the springs 15 which return it when released by the cam.

The head and tail stocks are stopped by the dog 92 which engages one of the stops 93 on the head stock (see Figs. V, VI and XVI). There is a multiple of stops 93 on the head stock, there being a stop for each work chuck (see Fig. VII). The stop dog 92 is carried by the rock shaft 93' supported in a bearing in the pedestal 19 (see Figs. VI and XVI). The stop dog 92 is at one end of the rock shaft 93' and at the opposite end of the rock shaft is an arm 94 which is acted upon and controlled by the cam 95' on the face of the gear 95'', which is carried on the shaft 88 (see Figs. XV, XVI and II). Tension spring 94' (see Figs. II, XV and XVI) urges arm 94 into contact with the cam 95'. The gear 95'' is driven by the gearing 95''' which is keyed to and carried by the shaft 20 (Fig. II). The dog 92 checks or stops the head and tail stocks in the proper position by engaging the head stock as described.

The driving means for the head stock have been heretofore described. The slip connection for the pulley 41 to the shaft 37 allows the checking or stopping of the head and tail stocks without injury to the driving connections. Further, as the bed moves inwardly to working position, the driving belt 40 is slackened or loosened so that it slips on the pulley 39. When the bed or table is swung to its forward position by the means described, the belt is tightened and the head stock rotated. The movements are timed so that the stop is released as the table moves forward. As the table swings to its working position, the pattern cams 95 (see Fig. V) on the live spindles are brought into engagement with the disk-like roller 96, the shape of the cams 95 controlling the shape of the spoke. This roller 96 is mounted on the bearing 97 supported for adjustment on the link 98 pivoted at 99 on the cutter shaft pedestal 91 (see Figs. VI and XIII). This bearing is adjusted by means of the set screws 100 supported by the yoke 101 to engage a lug 102 on the bearing. See Figs. III, VI, XIII and XIIIA. By adjusting this roller 96, the size of the spoke is determined, the shape of the spoke being determined, as stated, by the pattern or shaping cams 95.

To permit the oscillation of the table under the action of the cams 95, the fork of the arm 11 is made somewhat wider than the diameter of the roller 12 so that the bed can oscillate without communicating its movement to the rock shaft 9. When the table is in its inner or working position, the arm 10 engages the stop 103. See Fig. XXIV. This stops the bed with the roller 12 free to play in the lost motion space provided, as described, in the arm 11.

The driving of the live spindles begins before the work reaches the cutting position so that the work is being rotated at full speed as it moves into engagement with the knives, which prevents splintering and undue shock. In moving to the cutting position, the speed of the live spindles is accelerated by the traveling of their pinions upon the driving pinion.

To prevent the drum rotating rearwardly on account of the action of the shaping cams on disk 96, a stop spring 104 is provided with the stops 93. See Fig. VI.

As the work passes from its cutting position, the finished spokes are released by the means described and at practically the same time the spindle gear clutches are released. The spokes are discharged on the table 105.

Our improved spoke lathe is of very large capacity, and aside from placing the spoke billets in the magazine, or holder, is entirely automatic. The billets are presented to the cutters so that the liability of splintering the billets is slight.

Having thus described our invention, what we claim as new and desire to secure by Letters Patent, is:

1. In a lathe, the combination of a frame, a spindle driving shaft, a head stock, a tail stock, a sleeve rotatably mounted on said shaft on which said head and tail stocks are mounted, live spindles carried by said head stock, gears rotatably mounted on said spindles, a gear on said shaft meshing with said gears on said spindles, clutches for connecting said spindle gears to said spindles, comprising adjustable clutch members slidably but non-rotatably mounted on said spindles, a releasing cam for said clutches, said adjustable clutch members having cam engaging flanges thereon adapted to engage said releasing cam as the head stock revolves, springs carried by said spindles for forcing the clutch members into engagement when they are released by said cam, and means for driving said head stock.

2. In a lathe, the combination of a frame, an oscillating work bed, means for oscillating said bed, a spindle driving shaft carried by said bed, a head stock rotatably mounted on said shaft, live spindles carried by said head stock and driven from said spindle driving shaft, means for driving said head stock comprising a gear thereon, a driving shaft having a gear meshing with the gear on said head stock, a pulley on said driving shaft having a friction driving connection therewith, a driving belt for said pulley, said belt being tightened by the outward movement of the oscillating bed, a stop for said head stock, a controlling cam for said stop, driving connections for said cam and said spindle driving shaft, and a return stop for said head stock.

3. In a lathe, the combination of a frame, an oscillating work bed, means for oscillating said bed, a spindle driving shaft carried by said bed, a head stock rotatably mounted on said shaft, live spindles carried by said head stock and driven by said spindle driving shaft, means for driving said head stock comprising a gear thereon, a driving shaft having a gear meshing with the gear on said head stock, a pulley on said driving shaft having a friction driving connection therewith, a driving belt for said pulley, said belt being tightened by the forward movement of the oscillating bed, and a cam controlled stop for said head stock for holding said head stock against movement during predetermined intervals.

4. In a lathe, the combination of a frame, a spindle driving shaft, a head stock rotatably mounted on said shaft, live spindles carried by said head stock and driven from said spindle driving shaft, friction means for driving said head stock, a stop for said head stock, a controlling cam for said stop, and driving connections for said cam and said spindle driving shaft whereby said head stock is driven with a step by step movement.

5. In a lathe, the combination of a frame, a head stock, live spindles carried by said head stock, a driving gear, gears rotatably mounted on said spindles and meshing with said driving gear, clutches for connecting said spindle gears to said spindles, comprising adjustable clutch members slidably but non-rotatably mounted on said spindles, a releasing cam for said clutches, said adjustable clutch members having cam engaging flanges thereon adapted to engage said releasing cam as the head stock revolves, springs carried by said spindles for engaging said clutches when said adjustable members are released by said cam, and means for driving said head stock.

6. In a lathe, the combination of a frame, an oscillating work bed, means for oscillating said bed, a head stock carried by said bed, live spindles carried by said head stock, driving means for said spindles, means for driving said head stock, comprising a driving shaft, a pulley frictionally connected to said shaft, and a driving belt, said belt being tightened by the outward movement of the oscillating bed whereby the head stock is driven when the bed moves outward.

7. In a lathe, the combination of a frame, an oscillating work bed, means for oscillating said bed at predetermined intervals, a head stock carried by said bed, live spindles carried by said head stock, driving means for said spindles, driving means for said head stock comprising a driving shaft, a pulley having a frictional connection with said driving shaft, a driving belt for said pulley, said belt being tightened to drive the pulley by the outward movement of the oscillating bed, a stop adapted to engage said head stock to hold the same against movement, a releasing cam for withdrawing said stop, and driving connections for said cam and spindle driving shaft whereby the engaging and releasing of the stop is timed.

8. In a lathe, the combination of a frame, an oscillating work bed, means for oscillating said bed, a spindle driving shaft carried by said bed, a head stock, live spindles carried by said head stock and driven by said shaft, means for driving said head stock comprising a friction clutch, and a driving belt, said belt being tightened by the outward movement of the oscillating bed, a stop for said head stock, and a controlling cam for said stop whereby its engaging and disengaging is timed.

9. In a lathe, the combination of a frame, a bed, a head stock, spindles carried by said head stock, gears on said spindles, a driving gear meshing with said gears on said spindles, clutches for securing said spindle gears to said spindles, means for controlling said clutches whereby they are caused to engage and disengage as the head stock is revolved, chucks on said spindles, a positioning member having curved abutments thereon disposed side by side, the end of the outer abutment being in advance of the end of the inner abutment, radially disposed engaging fingers on said spindles arranged in opposed pairs, one pair being wider than the other and being adapted to engage the outer abutment, the narrower fingers being adapted to engage the inner abutment, said spindles having opposed spring engaging members thereon disposed radially between said engaging fingers, a spring arranged on said frame to coact with said spring engaging members on said spindles whereby the chucks are positioned and rotation of the spindles prevented as they are carried to the work receiving position, all coacting for the purpose specified.

10. In a lathe, the combination of a frame, a bed, a head stock, spindles carried by said head stock, gears on said spindles, a driving gear meshing with said gears on said spindles, clutches for securing said spindle gears to said spindles, means for controlling said clutches whereby they are caused to engage and disengage as the head stock is revolved, chucks on said spindles, a positioning member having curved abutments thereon disposed side by side, the end of the outer abutment being in advance of the end of the inner abutment, radially disposed engaging fingers on said spindles arranged in opposed pairs, one pair being wider than the other and being adapted to engage the outer abutment, the narrower fingers being adapted to engage the inner abutment whereby the chucks are positioned and rotation of the spindles prevented as they are carried to work receiving position, all coacting for the purpose specified.

11. In a lathe, the combination of a frame, a bed, a head stock, spindles carried by said head stock, gears on said spindles, a driven gear meshing with said gears on said spindles, clutches for securing said spindle gears to said spindles, means for controlling said clutches whereby they are caused to engage and disengage as the head stock is revolved, chucks on said spindles, a positioning member, engaging members on said spindles adapted to coact therewith whereby the chucks are positioned and rotation of the spindles prevented as they are carried to work receiving position, all coacting for the purpose specified.

12. In a lathe, the combination of a frame, a bed comprising a lower member pivoted at one end and slidably supported at the other for oscillating movement, an upper member pivotally connected to the lower member at its swinging end for oscillating movement thereon, a rock shaft having arms thereon connected to the swinging ends of said bed members, a cutter shaft, means for actuating said bed to and from said cutter shaft, a head stock carried by said upper bed member, spindles on said head stock having pattern cams thereon, there being lost motion in the connection for said rock shaft to the upper bed member adapted to permit the oscillation of the upper bed member under the action of the work cam.

13. In a lathe, the combination of a frame, an oscillating work bed, a spindle driving shaft carried by said bed, a roller carried by the frame, a cam shaft carried by said bed and driven by said spindle driving shaft, and a cam on said shaft coöperating with the roller on said frame to oscillate said bed.

14. In a lathe, the combination of the frame, a head stock and a tail stock, multiple spindles carried by said head stock, means for driving the same, chuck members, clutch members for connecting the spindles to the said chuck members with means of automatically controlling the same, means for positioning the chuck members to accurately engage the word fed thereto, and a feed magazine for delivering the work.

15. In a lathe, the combination of the frame, a head stock and a tail stock, multiple spindles carried by said head stock, means for driving the same, chuck members, clutch members for connecting the spindles to the said members, with means of automatically controlling the same, means for positioning the chuck members to accurately engage the work fed thereto, a feed magazine for delivering the work, a cutter head for turning the said work, and a pattern cam and opposed disk associated with said frame and cutter head for turning irregular forms.

16. In a lathe, the combination of a frame, a work bed mounted thereon, a cutter head shaft mounted in said frame, a spindle driving shaft on said bed, a head-stock rotatably mounted on said spindle driving shaft, spindles rotatably mounted in said head-stock and driven by said spindle driving shaft, pattern cams on said spindles, automatic means for shifting said head-stock in relation to said cutter head shaft comprising a cam shaft driven by said spindle driving shaft, a cam on said cam shaft, means on said frame with which said cam engages to push the head-stock away from said frame, and a spring urging said head-stock in the opposite direction, means on said frame for engaging said pattern cams comprising a rotatable disk, a bearing on said frame for supporting said disk, and means for adjusting said bearing transversely of said cutter head shaft to regulate the size of the article.

17. In a lathe, the combination of a frame, a work bed mounted thereon, a cutter head shaft mounted in said frame, a spindle driving shaft on said bed, a head-stock rotatably mounted on said spindle driving shaft, spindles rotatably mounted in said head-stock and driven by said spindle driving shaft, pattern cams on said spindles, automatic means for shifting said head-stock in relation to said cutter head shaft, means on said frame for engaging said pattern cams comprising a rotatable disk, a bearing on said frame for supporting said disk, and means for adjusting said bearing transversely of said cutter head shaft to regulate the size of the article.

18. In a lathe, the combination of a frame, a work bed mounted thereon, a cutter head shaft mounted in said frame, a spindle driving shaft on said bed, a head-stock rotatably mounted on said spindle driving shaft, spindles rotatably mounted in said head-stock and driven by said spindle driving shaft, pattern cams on said spindles, automatic means for shifting said head-stock in relation to said cutter head shaft comprising a cam shaft driven by said spindle driving shaft, a cam on said cam shaft, means on said frame with which said cam engages to push the head-stock away from said frame, and a spring for urging said head-stock in the opposite direction, means on said frame for engaging said pattern cams, and means for adjusting said last-named means to regulate the size of the article.

19. In a lathe, the combination of a frame, a work bed mounted thereon, a cutter head shaft mounted in said frame, a spindle driving shaft on said bed, a head-stock rotatably mounted on said spindle driving shaft, spindles rotatably mounted in said head-stock and driven by said spindle driving shaft, pattern cams on said spindles, automatic means for shifting said head-stock in relation to said cutter head shaft, means on said frame for engaging said pattern cams, and means for adjusting said last named means to regulate the size of the article.

20. In a lathe, the combination of a frame, a work bed mounted thereon, a cutter head shaft mounted in said frame, a head-stock rotatably mounted on said bed, means for rotating said headstock, spindles rotatably mounted in said head-stock, means for driving said spindles, a pattern cam mounted on said work bed, means on said frame for engaging said pattern cam, and means for adjusting said last-named means to regulate the size of the article.

In witness whereof, we have hereunto set our hands and seals in the presence of two witnesses.

WILLIAM KISTLER. [L. S.]
ARTHUR L. BUTCHER. [L. S.]

Witnesses:
RICHARD PRICE,
GENEVIEVE HICKEY.